US009860560B2

(12) United States Patent
Pu et al.

(10) Patent No.: US 9,860,560 B2
(45) Date of Patent: Jan. 2, 2018

(54) METHOD FOR PALETTE MODE CODING

(71) Applicant: QUALCOMM Incorporated, San Diego, CA (US)

(72) Inventors: Wei Pu, San Diego, CA (US); Rajan Laxman Joshi, San Diego, CA (US); Jianle Chen, San Diego, CA (US); Marta Karczewicz, San Diego, CA (US); Cheng-Teh Hsieh, San Diego, CA (US); Feng Zou, San Diego, CA (US); Joel Sole Rojals, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 14/754,577

(22) Filed: Jun. 29, 2015

(65) Prior Publication Data

US 2016/0007042 A1    Jan. 7, 2016

Related U.S. Application Data

(60) Provisional application No. 62/028,039, filed on Jul. 23, 2014, provisional application No. 62/020,340, filed on Jul. 2, 2014.

(51) Int. Cl.
*H04N 19/593* (2014.01)
*H04N 19/91* (2014.01)
(Continued)

(52) U.S. Cl.
CPC ......... *H04N 19/593* (2014.11); *H04N 19/176* (2014.11); *H04N 19/70* (2014.11); *H04N 19/91* (2014.11)

(58) Field of Classification Search
CPC .... H04N 19/176; H04N 19/593; H04N 19/70; H04N 19/91; H04N 19/186; H04N 19/182; H04N 19/93; H04N 19/105
See application file for complete search history.

(56) References Cited

U.S. PATENT DOCUMENTS

2015/0264365 A1*   9/2015   Tsai ..................... H04N 19/593
                                                                    375/240.03
2015/0312568 A1*  10/2015   Lainema ................ H04N 19/70
                                                                    375/240.02

(Continued)

OTHER PUBLICATIONS

Gisquet C., et al., "SCCE3 Test C.2: combination of palette coding tools", 18. JCT-VC Meeting; Jun. 30, 2014-Jul. 9, 2014; Sapporo; (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/,, No. JCTVC-R0086, Jun. 20, 2014 (Jun. 20, 2014), pp. 1-4.

(Continued)

*Primary Examiner* — Behrooz Senfi

(57) ABSTRACT

A method for decoding video data provided in a bitstream, where the bitstream includes a coding unit (CU) coded in palette mode, includes: parsing a palette associated with the CU provided in the bitstream; parsing one or more run lengths provided in the bitstream that are associated with the CU; parsing one or more index values provided in the bitstream that associated with the CU; and parsing one or more escape pixel values provided in the bitstream that are associated with the CU. The escape pixel values may be parsed from consecutive positions in the bitstream, the consecutive positions being in the bitstream after all of the run lengths and the index values associated with the CU. The method may further include decoding the CU based on the parsed palette, parsed run lengths, parsed index values, and parsed escape values.

24 Claims, 10 Drawing Sheets

(51) Int. Cl.
*H04N 19/176* (2014.01)
*H04N 19/70* (2014.01)

(56) References Cited

U.S. PATENT DOCUMENTS

2016/0301938 A1* 10/2016 Sun .................. H04N 19/182
2016/0323594 A1* 11/2016 Sun .................. H04N 19/176
2017/0127058 A1* 5/2017 Misra ............... H04N 19/105

OTHER PUBLICATIONS

International Search Report and Written Opinion—PCT/US2015/038629—ISA/EPO—dated Oct. 7, 2015.
Lainema J., et al., "SCCE3: Test B.14—Restricted run coding", 18. JCT-VC Meeting; Jun. 30, 2014-Jul. 9, 2014; Sapporo; (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/,, No. JCTVC-R0045, Jun. 5, 2014, pp. 1-4.
Laroche G., et al., "SCCE3 Test B.7: palette run coding", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16); URL: http://wftp3.itu.int/av-arch/jctvc-site/,, No. JCTVC-R0085, Jun. 20, 2014 (Jun. 20, 2014), XP030116337, pp. 1-9.
Pu W., et al., "SCCE3: Test B.12—Binarization of Escape Sample and Palette Index", 18. JCT-VC Meeting; Jun. 30, 2014-Jul. 9, 2014; Sapporo; (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/,, No. JCTVC-R0065, Jun. 21, 2014, pp. 1-3.
Xiu X., et al., "Non-CE6: Removal of parsing dependency in palette-based coding", 19. JCT-VC Meeting; Oct. 17, 2014-Oct. 24, 2014; Strasbourg; (Joint Collaborative Team on Video Coding of ISO/IEC JTC1/SC29/WG11 and ITU-T SG.16 ); URL: http://wftp3.itu.int/av-arch/jctvc-site/ No. JCTVC-S0181-r1, Oct. 17, 2014, 9 pages; XP030116964.
Xiu X., et al., "Description of screen content coding technology proposal by InterDigital", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16 ); URL: http://wftp3.itu.int/av-arch/jctvc-site/,, No. JCTVC-Q0037, Mar. 18, 2014 (Mar. 18, 2014), XP030115927, 30 pages.
Xu M., et al., "Non-CE6: Simplification on Escape Coding of Palette Mode in HEVC SCC," 19. JCT-VC Meeting; Oct. 17, 201 Oct. 24, 2014; Strasbourg; (Joint Collaborative Team on Video Coding of ISO/IEC JTC1/SC29/WG11 and ITU-T SG.16 ); URL: http://wftp3.itu.int/av-arch/jctvc-site/,, No. JCTVC-S0150. Oct. 8, 2014 (Oct. 8, 2014), XP030116920, 3 Pages.
Zhu J., et al., "AHG10: Modified copy above mode for palette based coding", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16 ); URL: http://wftp3.itu.int/av-arch/jctvc-site/ , No. JCTVC-Q0174-v2, Mar. 29, 2014, XP030116122, 3 pages.

* cited by examiner

METHOD FOR PALETTE MODE CODING

INCORPORATION BY REFERENCE TO PRIORITY APPLICATION(S)

This application claims the benefit of U.S. Provisional Application No. 62/020,340, filed Jul. 2, 2014 and U.S. Provisional Application No. 62/028,039, filed Jul. 23, 2014.

TECHNICAL FIELD

This disclosure relates to the field of video coding and compression, and particularly to screen content coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by Moving Picture Experts Group-2 (MPEG-2), MPEG-4, International Telegraph Union Telecommunication Standardization Sector (ITU-T) H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

With the prevalence of high speed Internet access, emerging video applications such as remote desktop sharing, virtual desktop infrastructure, and wireless display require high compression efficiency of screen contents. However, additional intra and inter video coding tools were designed primarily for natural contents. Screen contents have significantly different characteristics compared with natural contents (e.g., sharp edges and less or no noise), which makes those traditional coding tools less sufficient.

SUMMARY

The systems, methods and devices of this disclosure each have several innovative aspects, no single one of which is solely responsible for the desirable attributes disclosed herein.

In one aspect, a method of decoding video data in a bitstream, where the bitstream includes a coding unit (CU) coded in palette mode, includes: parsing a palette associated with the CU provided in the bitstream, the palette including a plurality of palette entries that are each associated with an index value and a pixel value associated with the index value; parsing one or more run lengths provided in the bitstream that are associated with the CU, each run length indicating a number of consecutive positions, starting from and including a current position in the CU, that are associated with a copy-left mode or a copy-above mode; parsing one or more index values provided in the bitstream that associated with the CU, each index value indicating a pixel value in the palette that is associated with the current position in the CU; parsing one or more escape pixel values provided in the bitstream that are associated with the CU, each escape pixel value indicating a pixel value that is not in the palette, wherein the escape pixel values are parsed from consecutive positions in the bitstream, the consecutive positions being in the bitstream after all of the run lengths and the index values associated with the CU; and decoding the CU based on the parsed palette, parsed run lengths, parsed index values, and parsed escape values.

In another aspect, an apparatus for decoding video data provided in a bitstream includes a memory and a processor in communication with the memory. The memory is configured to store video data associated with the bitstream, the bitstream including a coding unit (CU) coded in palette mode. The processor is configured to: parse a palette associated with the CU provided in the bitstream, the palette including a plurality of palette entries that are each associated with an index value and a pixel value associated with the index value; parse one or more run lengths provided in the bitstream that are associated with the CU, each run length indicating a number of consecutive positions, starting from and including a current position in the CU, that are associated with a copy-left mode or a copy-above mode; parse one or more index values provided in the bitstream that associated with the CU, each index value indicating a pixel value in the palette that is associated with the current position in the CU; parse one or more escape pixel values provided in the bitstream that are associated with the CU, each escape pixel value indicating a pixel value that is not in the palette, wherein the escape pixel values are parsed from consecutive positions in the bitstream, the consecutive positions being in the bitstream after all of the run lengths and the index values associated with the CU; and decode the CU based on the parsed palette, parsed run lengths, parsed index values, and parsed escape values.

In one aspect, a method of encoding video data in a bitstream includes: analyzing a plurality of pixels in a coding unit (CU), each pixel having a pixel value associated therewith; generating a palette based on the plurality of pixels in the CU, the palette including a plurality of palette entries that are each associated with an index value and a pixel value associated with the index value; determining one or more run lengths associated with the CU in the bitstream, each run length indicating a number of consecutive positions, starting from and including a current position in the CU, that are associated with a copy-left mode or a copy-above mode; determining one or more index values associated with the CU in the bitstream, each index value indicating a pixel value in the palette that is associated with the current position in the CU; determining one or more escape pixel values associated with the CU in the bitstream, each escape pixel value indicating a pixel value that is not in the palette; and encoding the CU based on the generated palette, determined run lengths, determined index values, and determined escape pixel values, wherein the escape pixel values are encoded in consecutive positions in the bitstream, the consecutive positions being in the bitstream after all of the run lengths and the index values associated with the CU.

In another aspect, an apparatus for encoding video data in a bitstream includes a memory and a processor in communication with the memory. The memory is configured to store video data associated with the bitstream, the bitstream including a coding unit (CU) coded in palette mode. The processor is configured to: analyze a plurality of pixels in a coding unit (CU), each pixel having a pixel value associated therewith; generate a palette based on the plurality of pixels in the CU, the palette including a plurality of palette entries that are each associated with an index value and a pixel value associated with the index value; determine one or more run lengths associated with the CU in the bitstream, each run length indicating a number of consecutive positions, starting from and including a current position in the CU, that are associated with a copy-left mode or a copy-above mode; determine one or more index values associated with the CU in the bitstream, each index value indicating a pixel value in the palette that is associated with the current position in the CU; determine one or more escape pixel values associated with the CU in the bitstream, each escape pixel value indicating a pixel value that is not in the palette; and encode the CU based on the generated palette, determined run lengths, determined index values, and determined escape pixel values, wherein the escape pixel values are encoded in consecutive positions in the bitstream, the consecutive positions being in the bitstream after all of the run lengths and the index values associated with the CU.

DETAILED DESCRIPTION

Figure 1A:
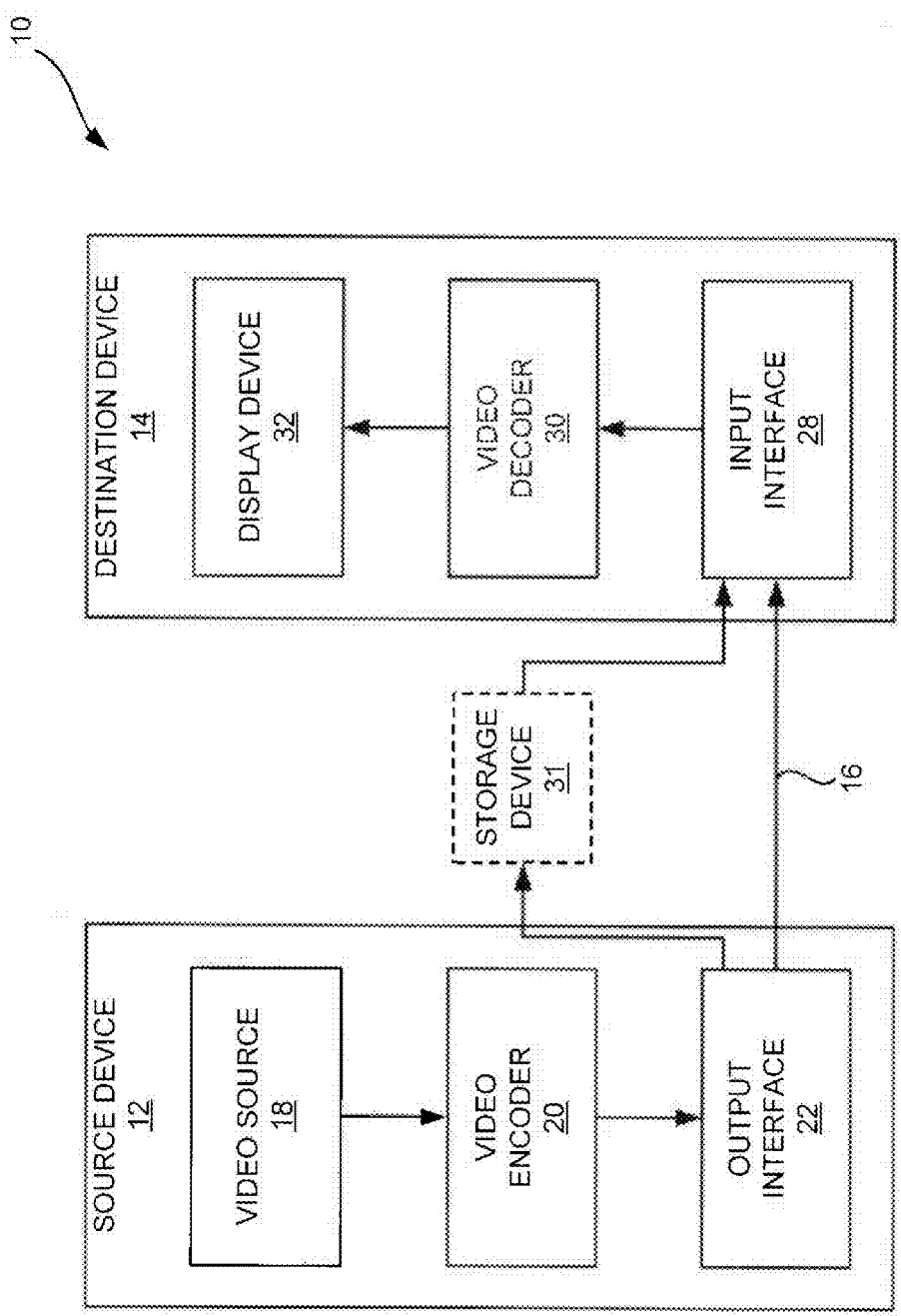
FIG. 1A is a block diagram illustrating an example video encoding and decoding system that may utilize techniques in accordance with aspects described in this disclosure.

In existing implementations of screen content coding, there may be some redundancies in the bitstream. These redundancies may be removed by skipping certain syntax element signaling when certain conditions are satisfied. In addition, some syntax elements may introduce parsing dependency. For example, a syntax element for indicating the run mode may not need to be signaled if the current pixel is in the first line of the block, since the decoder may infer the run mode to be index copy mode (e.g., copy left mode). In addition, in a case where the decoder decodes the index value first, and depending on the decoded index value, the decoder decides whether the mode is index copy mode or escape mode (e.g., based on whether or not the index value represents an escape index value). If the decoder determines the mode to be index copy mode, the decoder parser continues to parse run length. If the decoder determines the mode to be escape mode, the decoder parser may continue to parse escape values and/or run length. Since parsers usually operate at a much higher speed than decoders, such dependency between decoding engine and parsing engine may affect parser's throughput (e.g., since the parsing engine may need to wait for the decoding engine to decode the parsed bits). Thus, an improved method of processing blocks coded in palette coding mode is desired. In this application, several novel methods for organizing the palette elements in the bitstream to avoid or reduce the parsing dependency in palette mode are described.

In the description below, H.264/Advanced Video Coding (AVC) techniques related to certain embodiments are described; the HEVC standard and related techniques are also discussed. While certain embodiments are described herein in the context of the HEVC and/or H.264 standards, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including the range extension.

HEVC generally follows the framework of previous video coding standards in many respects. The unit of prediction in HEVC is different from the units of prediction (e.g., macroblocks) in certain previous video coding standards. In fact, the concept of a macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), and HEVC including the range extension.

In addition, a video coding standard, namely HEVC, has been developed by the Joint Collaboration Team on Video Coding (JCT-VC) of ITU-T Video Coding Experts Group (VCEG) and ISO/IEC MPEG. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The range extension to HEVC is also being developed by the JCT-VC.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding.

In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
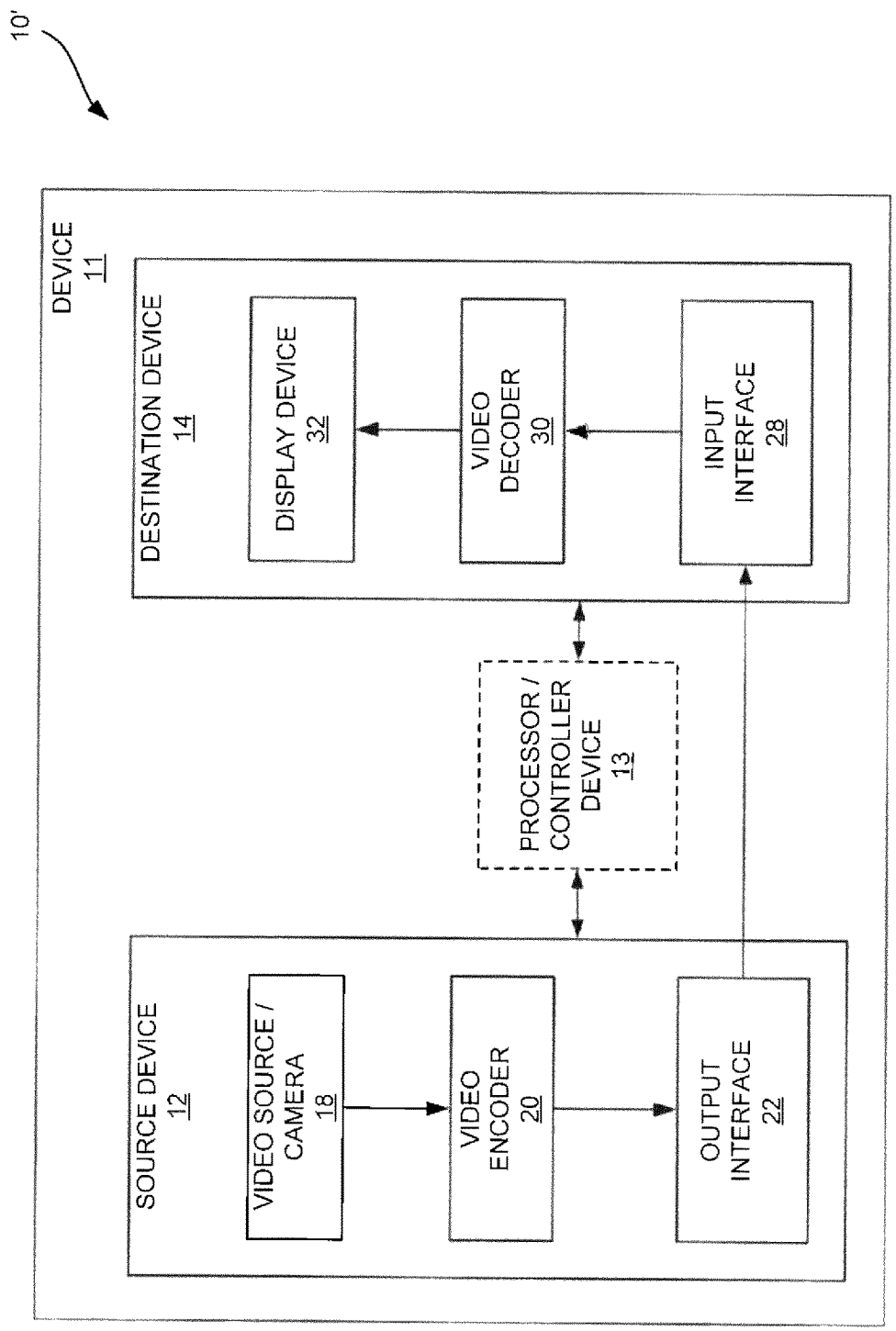
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to a storage device 31 (optionally present). Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network (WLAN) connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2 or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated FIG. 3 or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a controller/processor device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as HEVC, and may conform to a HEVC Test Model (HM). Alternatively, the video encoder 20 and the video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include video parameter sets (VPS), sequence parameter sets (SPSs), picture parameter sets (PPSs), adaptation parameter sets (APSs), and other syntax structures. An SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate a coded picture, the video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). The video encoder 20 may use quadtree partitioning to partition the video blocks of treeblocks into video blocks associated with CUs, hence the name "treeblocks."

In some examples, the video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

To generate a coded slice, the video encoder 20 may perform encoding operations on each treeblock in a slice. When the video encoder 20 performs an encoding operation on a treeblock, the video encoder 20 may generate a coded treeblock. The coded treeblock may comprise data representing an encoded version of the treeblock.

When the video encoder 20 generates a coded slice, the video encoder 20 may perform encoding operations on (e.g., encode) the treeblocks in the slice according to a raster scan order. For example, the video encoder 20 may encode the treeblocks of the slice in an order that proceeds from left to right across a topmost row of treeblocks in the slice, then from left to right across a next lower row of treeblocks, and so on until the video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, the video encoder 20 may be able to access information generated by encoding treeblocks above and to the left of the given treeblock when encoding the given treeblock. However, the video encoder 20 may be unable to access information generated by encoding treeblocks below and to the right of the given treeblock when encoding the given treeblock.

To generate a coded treeblock, the video encoder 20 may recursively perform quadtree partitioning on the video block of the treeblock to divide the video block into progressively smaller video blocks. Each of the smaller video blocks may be associated with a different CU. For example, the video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times the video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

The video encoder 20 may perform encoding operations on (e.g., encode) each CU of a treeblock according to a z-scan order. In other words, the video encoder 20 may encode a top-left CU, a top-right CU, a bottom-left CU, and then a bottom-right CU, in that order. When the video encoder 20 performs an encoding operation on a partitioned CU, the video encoder 20 may encode CUs associated with sub-blocks of the video block of the partitioned CU according to the z-scan order. In other words, the video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, the video encoder 20 may be able to access information generated by encoding some CUs that neighbor the given CU when encoding the given CU. However, the video encoder 20 may be unable to access information generated by encoding other CUs that neighbor the given CU when encoding the given CU.

When the video encoder 20 encodes a non-partitioned CU, the video encoder 20 may generate one or more prediction units (PUs) for the CU. Each of the PUs of the CU may be associated with a different video block within the video block of the CU. The video encoder 20 may generate a predicted video block for each PU of the CU. The predicted video block of a PU may be a block of samples. The video encoder 20 may use intra prediction or inter prediction to generate the predicted video block for a PU.

When the video encoder 20 uses intra prediction to generate the predicted video block of a PU, the video encoder 20 may generate the predicted video block of the PU based on decoded samples of the picture associated with the PU. If the video encoder 20 uses intra prediction to generate predicted video blocks of the PUs of a CU, the CU is an intra-predicted CU. When the video encoder 20 uses inter prediction to generate the predicted video block of the PU, the video encoder 20 may generate the predicted video block of the PU based on decoded samples of one or more pictures other than the picture associated with the PU. If the video encoder 20 uses inter prediction to generate predicted video blocks of the PUs of a CU, the CU is an inter-predicted CU.

Furthermore, when the video encoder 20 uses inter prediction to generate a predicted video block for a PU, the video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. The video encoder 20 may generate the predicted video block for the PU based on the reference blocks of the PU.

After the video encoder 20 generates predicted video blocks for one or more PUs of a CU, the video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, the video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

The video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, the video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

The video encoder 20 may associate each CU with a quantization parameter (QP) value. The QP value associated with a CU may determine how the video encoder 20 quantizes transform coefficient blocks associated with the CU. The video encoder 20 may adjust the degree of quantization applied to the transform coefficient blocks associated with a CU by adjusting the QP value associated with the CU.

After the video encoder 20 quantizes a transform coefficient block, the video encoder 20 may generate sets of syntax elements that represent the transform coefficients in the quantized transform coefficient block. The video encoder 20 may apply entropy encoding operations, such as Context Adaptive Binary Arithmetic Coding (CABAC) operations, to some of these syntax elements. Other entropy coding techniques such as context-adaptive variable-length coding (CAVLC), probability interval partitioning entropy (PIPE) coding, or other binary arithmetic coding could also be used.

The bitstream generated by the video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, SEI, an access unit delimiter, filler data, or another type of data. The data in a NAL unit may include various syntax structures.

The video decoder 30 may receive the bitstream generated by the video encoder 20. The bitstream may include a coded representation of the video data encoded by the video encoder 20. When the video decoder 30 receives the bitstream, the video decoder 30 may perform a parsing operation on the bitstream. When the video decoder 30 performs the parsing operation, the video decoder 30 may extract syntax elements from the bitstream. The video decoder 30 may reconstruct the pictures of the video data based on the syntax elements extracted from the bitstream. The process to reconstruct the video data based on the syntax elements may be generally reciprocal to the process performed by the video encoder 20 to generate the syntax elements.

After the video decoder 30 extracts the syntax elements associated with a CU, the video decoder 30 may generate predicted video blocks for the PUs of the CU based on the syntax elements. In addition, the video decoder 30 may inverse quantize transform coefficient blocks associated with TUs of the CU. The video decoder 30 may perform inverse transforms on the transform coefficient blocks to reconstruct residual video blocks associated with the TUs of the CU. After generating the predicted video blocks and reconstructing the residual video blocks, the video decoder 30 may reconstruct the video block of the CU based on the predicted video blocks and the residual video blocks. In this way, the video decoder 30 may reconstruct the video blocks of CUs based on the syntax elements in the bitstream.

Video Encoder

Figure 2:
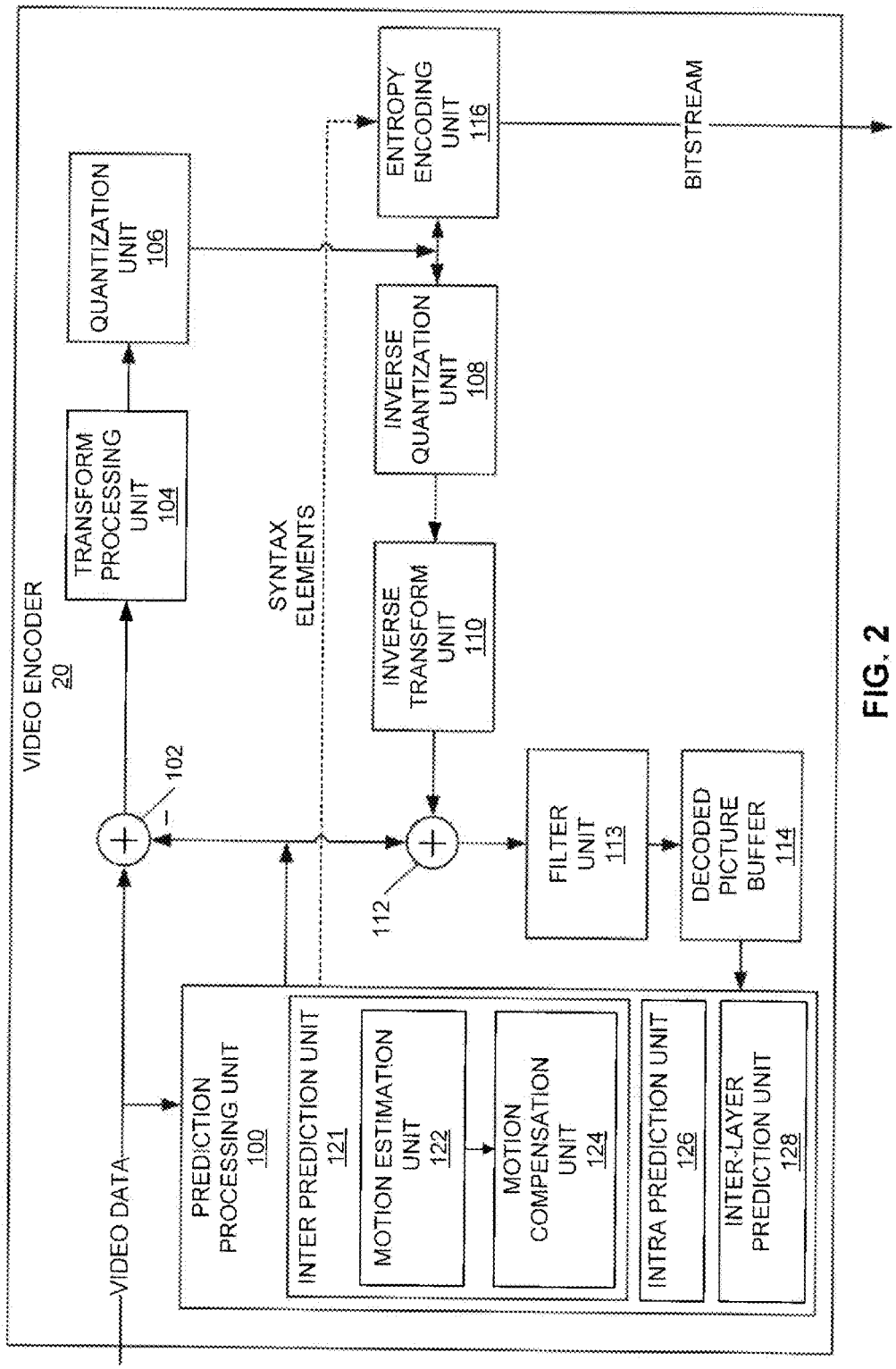
FIG. 2 is a block diagram illustrating an example of a video encoder that may implement techniques in accordance with aspects described in this disclosure.

FIG. 2 is a block diagram illustrating an example of the video encoder 20 that may implement techniques in accordance with aspects described in this disclosure. The video encoder 20 may be configured to process a single layer of a video frame, such as for HEVC. Further, the video encoder 20 may be configured to perform any or all of the techniques of this disclosure. In some examples, the techniques described in this disclosure may be shared among the various components of the video encoder 20. In some examples, additionally or alternatively, a processor (not shown) may be configured to perform any or all of the techniques described in this disclosure.

For purposes of explanation, this disclosure describes the video encoder 20 in the context of HEVC coding. However, the techniques of this disclosure may be applicable to other coding standards or methods. The example depicted in FIG. 2 is for a single layer codec. However, in certain embodiments, some or all of the video encoder 20 may be duplicated for processing of a multi-layer codec.

The video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2, the video encoder 20 includes a plurality of functional components. The functional components of the video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, the video encoder 20 may include more, fewer, or different functional components. Furthermore, motion estimation unit 122 and motion compensation unit 124 may be highly integrated, but are represented in the example of FIG. 2 separately for purposes of explanation.

The video encoder 20 may receive video data. The video encoder 20 may receive the video data from various sources. For example, the video encoder 20 may receive the video data from video source 18 (e.g., shown in FIG. 1A or 1B) or another source. The video data may represent a series of pictures. To encode the video data, the video encoder 20 may perform an encoding operation on each of the pictures. As part of performing the encoding operation on a picture, the video encoder 20 may perform encoding operations on each slice of the picture. As part of performing an encoding operation on a slice, the video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

The video encoder 20 may perform encoding operations on each non-partitioned CU of a treeblock. When the video encoder 20 performs an encoding operation on a non-partitioned CU, the video encoder 20 generates data representing an encoded representation of the non-partitioned CU.

As part of performing an encoding operation on a CU, prediction processing unit 100 may partition the video block of the CU among one or more PUs of the CU. The video encoder 20 and the video decoder 30 may support various PU sizes. Assuming that the size of a particular CU is 2N×2N, the video encoder 20 and the video decoder 30 may support PU sizes of 2N×2N or N×N, and inter-prediction in symmetric PU sizes of 2N×2N, 2N×N, N×2N, N×N, 2N×nU, nL×2N, nR×2N, or similar. The video encoder 20 and the video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CIJ along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0". Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to the video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. The video decoder 30 may use the motion vector of the indicated neighboring PU and the motion vector difference to determine the motion vector of the PU. By referring to the motion information of a first PU when signaling the motion information of a second PU, the video encoder 20 may be able to signal the motion information of the second PU using fewer bits.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SHVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

The video encoder 20 may associate a QP value with a CU in various ways. For example, the video encoder 20 may perform a rate-distortion analysis on a treeblock associated with the CU. In the rate-distortion analysis, the video encoder 20 may generate multiple coded representations of the treeblock by performing an encoding operation multiple times on the treeblock. The video encoder 20 may associate different QP values with the CU when the video encoder 20 generates different encoded representations of the treeblock. The video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, the video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of the video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, the video encoder 20 may perform a CAVLC operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Video Decoder

Figure 3:
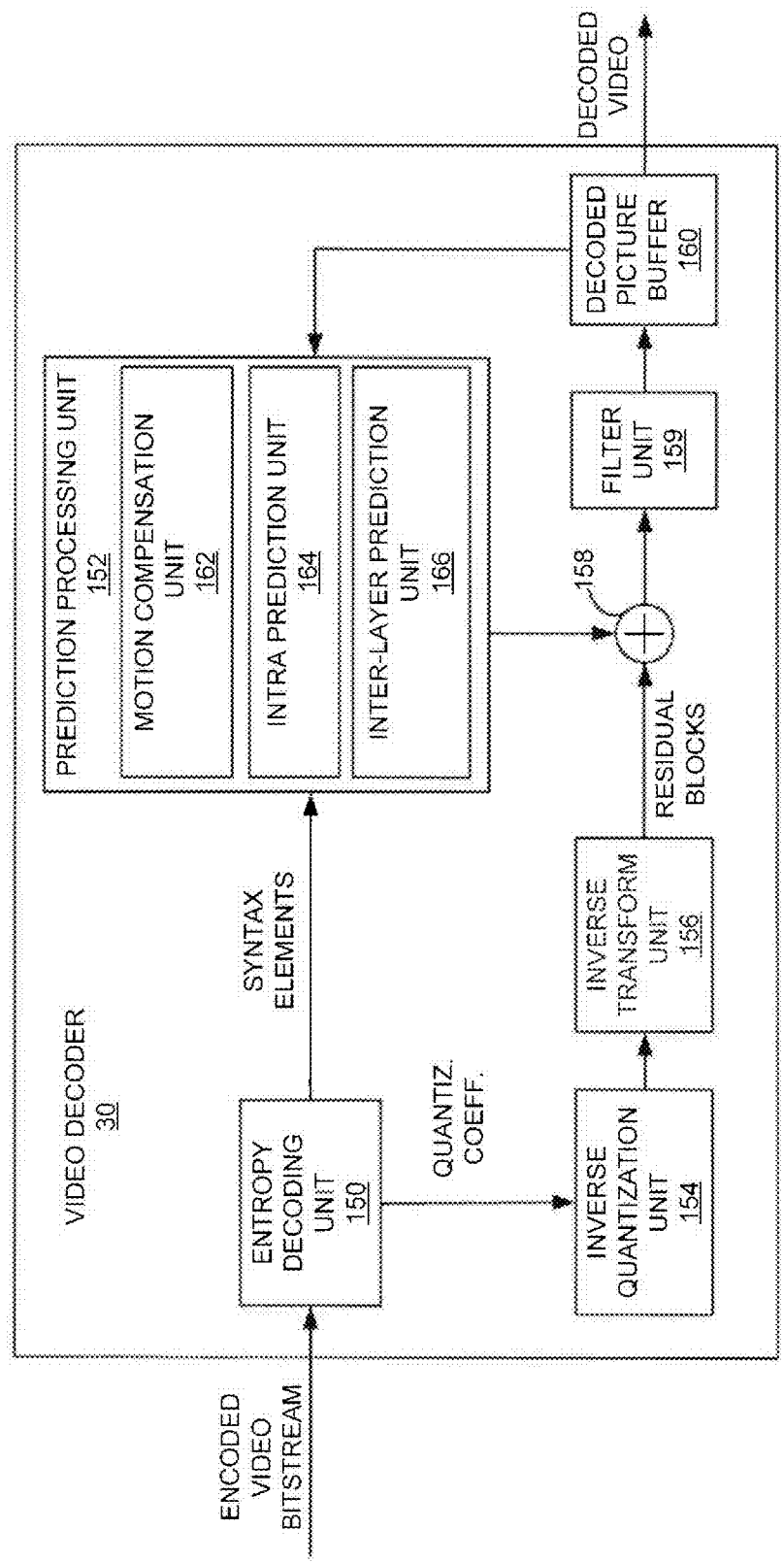
FIG. 3 is a block diagram illustrating an example of a video decoder that may implement techniques in accordance with aspects described in this disclosure.

FIG. 3 is a block diagram illustrating an example of the video decoder 30 that may implement techniques in accordance with aspects described in this disclosure. The video decoder 30 may be configured to process a single layer of a video frame, such as for HEVC. Further, the video decoder 30 may be configured to perform any or all of the techniques of this disclosure. In some examples, the techniques described in this disclosure may be shared among the various components of the video decoder 30. In some examples, additionally or alternatively, a processor (not shown) may be configured to perform any or all of the techniques described in this disclosure.

For purposes of explanation, this disclosure describes the video decoder 30 in the context of HEVC coding. However, the techniques of this disclosure may be applicable to other coding standards or methods. The example depicted in FIG. 3 is for a single layer codec. However, in certain implementations, some or all of the video decoder 30 may be duplicated for processing of a multi-layer codec.

In the example of FIG. 3, the video decoder 30 includes a plurality of functional components. The functional components of the video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, the video decoder 30 may perform a decoding pass generally reciprocal to the encoding pass described with respect to video encoder 20 of FIG. 2. In other examples, the video decoder 30 may include more, fewer, or different functional components.

The video decoder 30 may receive a bitstream that comprises encoded video data. The bitstream may include a plurality of syntax elements. When the video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL, units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, the video decoder 30 may perform a reconstruction operation on the non-partitioned CU. To perform the reconstruction operation on a non-partitioned CU, the video decoder 30 may perform a reconstruction operation on each TU of the CU. By performing the reconstruction operation for each TU of the CU, the video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by the video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from the video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by the video encoder 20 during generation of the predicted video block of the PU to calculate interpolated values for sub-integer samples of a reference block. Motion compensation unit 162 may determine the interpolation filters used by the video encoder 20 according to received syntax information and use the interpolation filters to produce the predicted video block.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, the video decoder 30 may also include inter-layer prediction unit 166. Inter-layer prediction unit 166 is configured to predict a current block (e.g., a current block in the enhancement layer) using one or more different layers that are available in SHVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra prediction data or inter-prediction data, as applicable, to reconstruct the video block of the CU. Thus, the video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, the video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, the video decoder 30 may perform, based on the video blocks in decoded picture buffer 160, intra prediction or inter prediction operations on PUs of other CUs.

Palette Coding Mode

In contrast to conventional intra and inter prediction that mainly removes redundancy between different coding units, palette coding targets the redundancy of repetitive pixel values/patterns within the coding unit. In the palette coding mode, a lookup table called a palette that maps pixel values into table indices (also called palette indices) is signaled first. In some implementations, the palette has a specified maximum size (e.g., 32 pixel values). The palette includes entries numbered by the table indices representing color component (e.g., RGB, YUV, etc.) values or intensities that can be used as predictors for block samples or as final reconstructed block samples. In some implementations, samples in a palette block are coded using three run-modes, i.e. 'copy-left mode' (or run mode), 'copy-above mode', and 'escape mode' (or pixel mode).

For a position in the palette block that is coded in copy-left mode, a palette index is first signaled followed by "run_length" (or "palette_run") (e.g., M). No additional information needs to be signaled for the current position and the following M positions in the palette block because the current position and the following M positions in the palette block have the same palette index that is signaled for the current position. The palette index (e.g., i) is shared by all three color components, which means that the reconstructed pixel values are (Y, U, V)=(palette$_Y$[i], palette$_U$[i], palette$_V$[i]) (assuming the color space is YUV).

For a position in the palette block that is coded in copy-above mode, a value "run_length" (or "copy_run") (e.g., N) is signaled to indicate that for the following N positions (N+1 positions in total, including the current one) in the palette block, the palette index is equal to the palette index of the position that is directly above in the palette block.

For a position in the palette block that is coded in escape mode (or pixel mode), a pixel value corresponding to the current position in the palette block is signaled. Escape mode may be signaled using an escape flag (e.g., a flag value of 1 indicates that the current position is coded in escape mode) or a palette index (e.g., an index value that does not correspond to any of the palette entries or an index value that is greater than or equal to the palette size).

Palette Bitstream

In existing implementations, a palette bitstream (e.g., a bitstream that includes coding units coded in palette coding mode) is organized as follows:

TABLE 1

| Palette mode bitstream |
|---|
| palette_entries |
| palette_index_map | palette_entries includes one or more pixel values each mapped to a table index. For example, if a given coding unit includes three unique pixel values (e.g., red, green, and blue), the palette entries may include three entries, (0, red), (1, green), and (2, blue), palette_index_map includes one or more palette blocks coded using the palette entries, where palette table indices (e.g., 0, 1, and 2 in the example above) are used to indicate the pixel values in the palette block.

Figure 4:
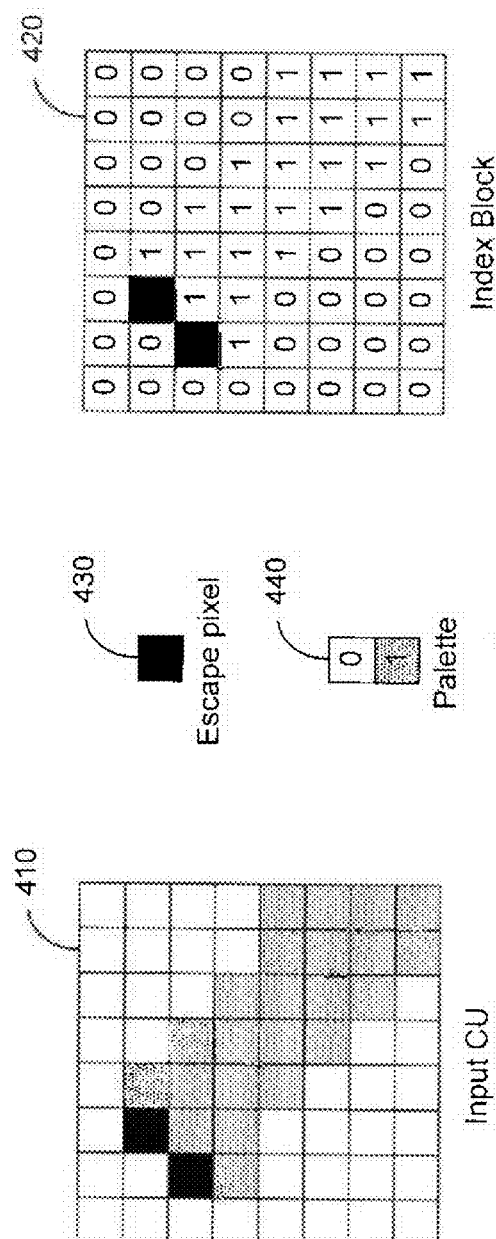
FIG. 4 is a block diagram illustrating an input CU, an index block, an escape pixel, and a palette associated with the CU.

FIG. 4 illustrates an example configuration of input CU 410, index block 420, escape pixel 430, and palette 440. As shown in FIG. 4, the input CU 410 contains three unique pixel values: white, grey, and black. Based on the frequency of white and grey, only white and grey pixel values are included in the palette 440, where an index value of 0 is associated with the white pixel value and an index value of 1 is associated with the grey pixel value. The black pixel value that is not included in the palette is labeled as an escape pixel 430, which is coded independently of the palette. As shown in FIG. 4, the index block 420 includes an index value for each position in the block. Two positions in the index block 420 are coded as in escape mode (e.g., without referring to palette indices 0 or 1). Although only a single escape pixel and only two palette entries are used in the example of FIG. 4, the embodiments of the present application are not limited as such, and any number of escape pixels and palette entries may be used. In some embodiments, the palette size is limited to 32 entries, and any pixel values not associated with one of the 32 entries become escape pixels. The maximum palette size may be set to any number. Further, the CU size is not limited to 8 pixels by 8 pixels, and may be 16×16 or any other size.

Example Syntax of Palette Bitstream

In some implementations, in the palette index map, a block coded in palette coding mode may take the following form in the bitstream:

TABLE 2

| palette_index_map bitstream (default setting) |
|---|
| while (not end) {<br>  run_mode_flag<br>  if (run_mode_flag == COPY_ABOVE)<br>    run_length<br>  else if (run_mode_flag == COPY_LEFT) {<br>    index<br>    if (index == ESCAPE_INDEX)<br>      escape_pixel_value<br>    else<br>      run_length<br>} |

In the example illustrated in Table 2, depending on the value of run_mode_flag, different syntax elements are signaled in the bitstream. If the run mode flag indicates that the current position in the palette block is coded in copy-above mode, the run body includes a run length value (the first instance of "run_length" above). If the run mode flag indicates that the current position in the palette block is coded in 'copy-left' mode, the run body includes an index value ("index") followed by a run length value (the second instance of "run_length" above), unless the index value corresponds to an escape index, in which case quantized escape pixel values ("escape_pixel_value") are signaled.

In an alternative implementation, an explicit escape flag is used. More specifically, the palette index map may take the following form in the bitstream;

TABLE 3 palette_index_map bitstream (alternative setting)

```
while (not end) {
    escape_flag
    if (escape_flag)
        escape_pixel_value
    else {
        run_mode_flag
        if (run_mode_flag == COPY_LEFT)
            index
        run_length
    }
}
```

In the example illustrated in Table 3, depending on the value of escape flag, different syntax elements are signaled in the bitstream. If the escape flag has a value of 1, the run body includes quantized escape pixel values. If the escape flag has a value of 0, a run mode flag is signaled to differentiate 'copy above' and 'copy left' modes. If the run mode flag indicates that the current position in the palette block is coded in 'copy-left' mode, the bitstream includes an index value followed by a run length value. Otherwise, only a run length value is signaled in the bitstream.

Figure 5:
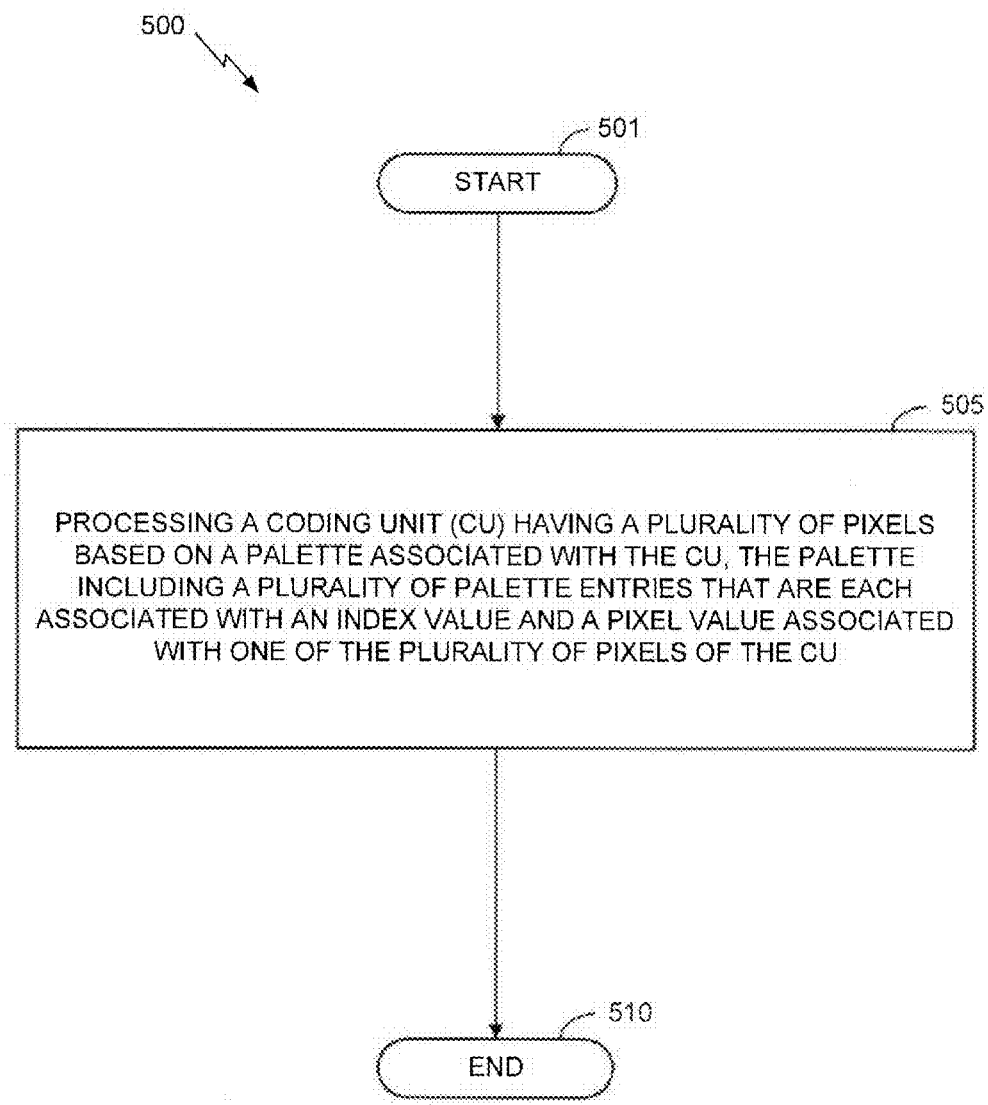
FIG. 5 is a flowchart illustrating a method for coding video data in a bitstream in accordance with aspects described in this disclosure.

FIG. 5 is a flowchart illustrating a method 500 for coding non-natural video data in a bitstream in accordance with aspects of the present disclosure. The steps illustrated in FIG. 5 may be performed by a video encoder (e.g., the video encoder 20), a video decoder (e.g., the video decoder 30), or any other component. For convenience, method 500 is described as performed by a video coder (also simply referred to as coder), which may be the video encoder 20, the video decoder 30, or another component.

The method 500 begins at block 501. At block 505, the coder processes a coding unit (CU) having a plurality of pixels based on a palette associated with the CU. As described above, an encoder may derive the palette based on the content of the CU and signal the palette in the bitstream so that a decoder may process the CU using the palette associated with the CU. The palette may include a plurality of palette entries that are each associated with an index value and a pixel value. The pixel value may be associated with one of the pixels in the CU. In some embodiments, each palette entry is associated a unique pixel value that is found in the CU. Block 505 may comprise one or more steps and/or methods described with reference to FIGS. 6-8. The method ends at block 510.

Grouping Bypass Bins

In H.264, HEVC, and many other modern video coding standards, for a syntax element, after binarization, the 0/1 bin stream is fed into the context adaptive binary arithmetic coder (CABAC), in which the probability model (named "context") is adaptively selected and updated to track the non-stationary probability distribution. As a special case, the probability model may not be updated to improve the entropy coder's throughput. Bins coded using such a simplified method without context update is called bypass bins.

In the examples of Tables 2 and 3, there may be some redundancies in the bitstream. These redundancies may be removed by skipping to signal certain syntax elements when certain conditions are satisfied. In addition, some syntax elements may introduce parsing dependency. For example, in Table 2, syntax element run_mode_flag may not need to be signaled if the current pixel is in the first line of the block, since the decoder may infer the run mode to be index copy mode (e.g., copy left mode). In addition, in the example of Table 2, the decoder decodes the index value first, and depending on the decoded index value, the decoder decides whether the mode is index copy mode or escape mode (e.g., based on whether or not the index value represents an escape index value). If the decoder determines the mode to be index copy mode, the decoder parser continues to parse run length. If the decoder determines the mode to be escape mode, the decoder parser may continue to parse escape values and/or run length. Since parsers usually operate at a much higher speed than decoders, such dependency between decoding engine and parsing engine may affect parser's throughput (e.g., since the parsing engine may need to wait for the decoding engine to decode the parsed bits). Thus, an improved method of processing blocks coded in palette coding mode is desired. In this application, several novel methods for organizing the palette elements in the bitstream to avoid or reduce the parsing dependency in palette mode are described.

Embodiment #1: Put Quantized Escape Pixel Values at the End of a Palette Mode Block In some embodiments, all quantized escape pixel values are signaled at the end of a palette mode block in the bitstream. In such embodiments, entropy coder resetting may be applied after the (index, run-length) coding. For example, after coding all of the possible (index, run-length) pairs in the block, the arithmetic coding engine's ivlCurrRange variable (e.g., a variable specifying the range of the current arithmetic coding interval) is set to 256. With this method, the decoder may read the bits from the bitstream and treat them as they are without needing to invoke the CABAC coder. Without this procedure of resetting the variable to 256, while the context may not need to be updated, the decoder may still need to invoke the CABAC coder to make binary decisions. Therefore, the quantized escape pixel values can be parsed in parallel after parsing and/or decoding all the (index, run-length) pairs. In one embodiment, if the escape pixels are coded using fixed length code, then the escape pixels can be parsed and decoded in parallel after parsing the index-run block.

In another embodiment, if the escape pixels are coded using truncated binary code, then each color component of the escape pixel may take 'k' or 'k+1' bits depending on its quantized intensity. For example, in truncated binary encoding, for a syntax element with value X, assuming that its maximum possible value Max is known and that n=Max+1 and k=floor($\log_2(n)$) such that $2^k \le n < 2^{k+1}$ and let u=2k+1−n, if X<u, the truncated binary codeword is specified by the binary representation of X with length k. Otherwise, the truncated binary codeword is specified by the binary representation of X+u with length k+1. In such an embodiment, the first 'k' bits of each color component for all the escape pixels in the current block may be grouped together, followed by the optional $(k+1)^{th}$ bit. With such organization, the first 'k' bits of each color component for all the escape pixels can be parsed and decoded in parallel. Some dependency may still exist in parsing the optional $(k+1)^{th}$ bit.

Figure 6:
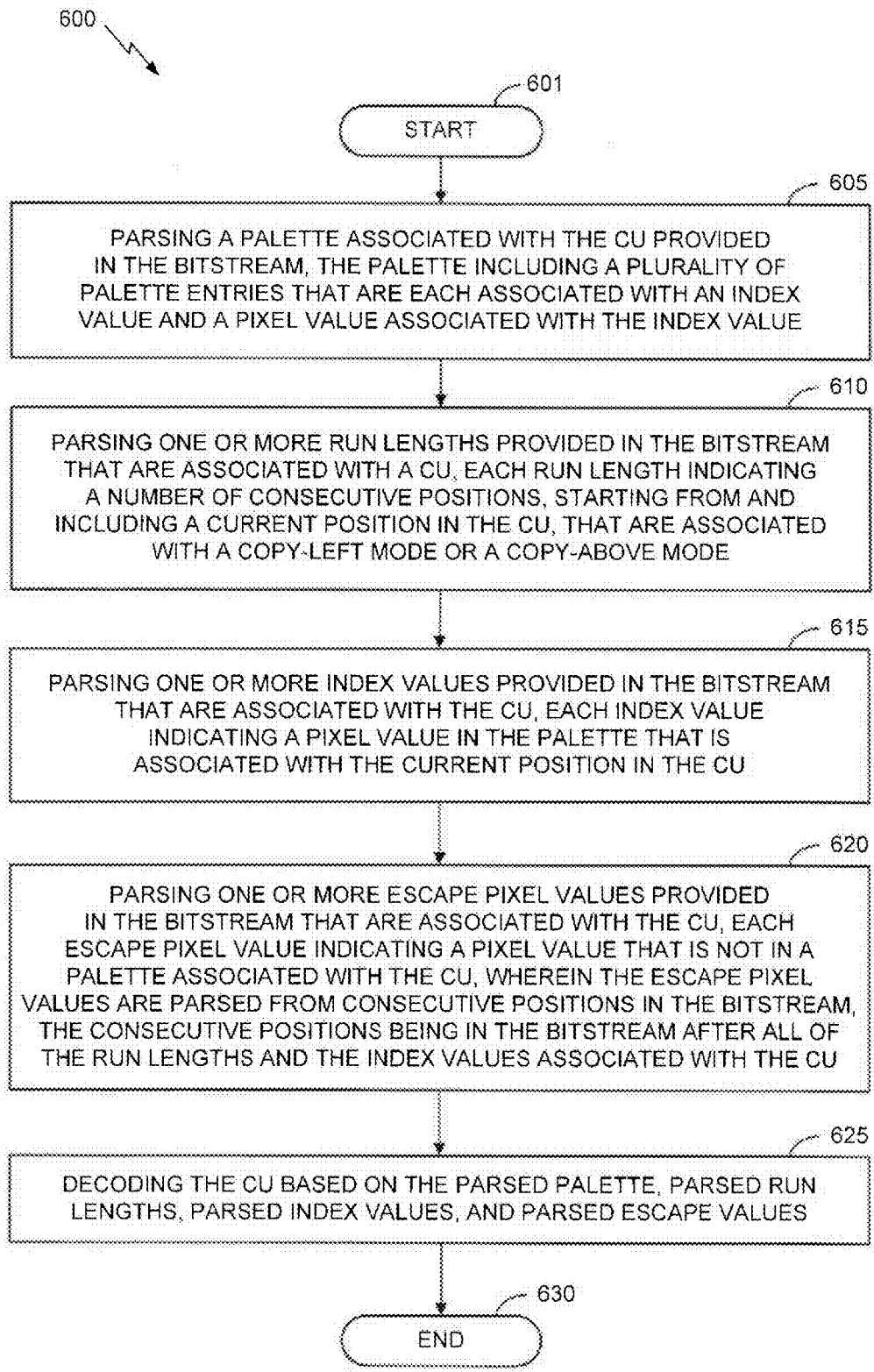
FIG. 6 is a flowchart illustrating a method for decoding video data in a bitstream in accordance with aspects described in this disclosure.

FIG. 6 is a flowchart illustrating a method 600 for decoding non-natural video data in a bitstream in accordance with aspects of the present disclosure. The steps illustrated in FIG. 6 may be performed by a video decoder (e.g., the video decoder 30) or any other component. For convenience, method 600 is described as performed by a video coder (also simply referred to as coder), which may be the video decoder 30 or another component.

The method 600 begins at block 601. At block 605, the coder parses a palette associated with the cu provided in the bitstream. The palette may include a plurality of palette entries that are each associated with an index value and a pixel value associated with the index value. An example of the palette is illustrated in FIG. 4.

At block 610, the coder parses one or more run lengths associated with a CU. As described above, each run length indicates the number of consecutive positions, starting from and including a current position in the CU, that are associated with a copy-left mode or a copy-above mode.

At block 615, the coder parses one or more index values associated with the CU. As described above, each index value indicates a pixel value in the palette that is associated with the current position in the CU. In the example of FIG. 4, an index value of 0 indicates that the current position in the CU has a white pixel value, and an index value of 1 indicates that the current position in the CU has a grey pixel value.

At block 620, the coder parses one or more escape pixel values associated with the CU. As described above, each escape pixel value indicates a pixel value that is not in the palette associated with the CU. In the example of FIG. 4, the two positions in the CU having black pixel values are coded in escape mode and the coder signals the black pixel values in the bitstream as escape pixel values. In some embodiments, the escape pixel values are parsed from consecutive positions in the bitstream (e.g., at the end of the portion of the bitstream associated with the CU). For example, the consecutive positions of the escape pixel values appear in the bitstream after all the run lengths and index values associated with the CU. In such embodiments, after all the run lengths and the index values have been parsed, the escape pixel values can be processed (e.g., parsed) in parallel. At block 625, the coder decodes the CU based on the parsed palette, parsed run lengths, parsed index values, and parsed escape values. The method ends at block 630.

In the method 600, one or more of the blocks shown in FIG. 6 may be removed (e.g., not performed) and/or the order in which the method is performed may be switched. For example, block 610 and block 615 may be performed together to parse each run length and index value pair associated with the CU. In some embodiments, additional blocks may be added to the method 600. The embodiments of the present disclosure are not limited to or by the example shown in FIG. 6, and other variations may be implemented without departing from the spirit of this disclosure.

Embodiment #2: Put Index Values at the End of a Palette Mode Block

In some embodiments, all index values are signaled at the end of a palette mode block in the bitstream. In one embodiment, all quantized escape values are signaled at the end of the palette mode block in the bitstream, following the group of all occurrences of index values. In another embodiment, all index values are signaled just before the quantized escape values in the bitstream.

Entropy coder resetting may be applied after the run-length coding. For example, after coding all of the possible run-lengths in the block, the arithmetic coding engine's ivlCurrRange variable (e.g., a variable specifying the range of the current arithmetic coding interval) is set to 256. Therefore, the index values and/or the escape values can be parsed in parallel after parsing and/or decoding all the run-lengths in the palette block. In one embodiment, if the index values are coded using fixed length code, then the index values can be parsed and decoded in parallel after parsing the run-length block.

In another embodiment, if the index values are coded using truncated binary code, then indexes may take 'k' or 'k+1' bits depending on its value. In such an embodiment, the first 'k' bits of each color component for all the index values and/or the escape pixels in the current block may be grouped together, followed by the optional $(k+1)^{th}$ bit. With such organization, the first 'k' bits of all the index values and/or the escape values in the current block can be parsed and decoded in parallel. Some dependency may still exist in parsing the optional $(k+1)^{th}$ bit.

Figure 7:
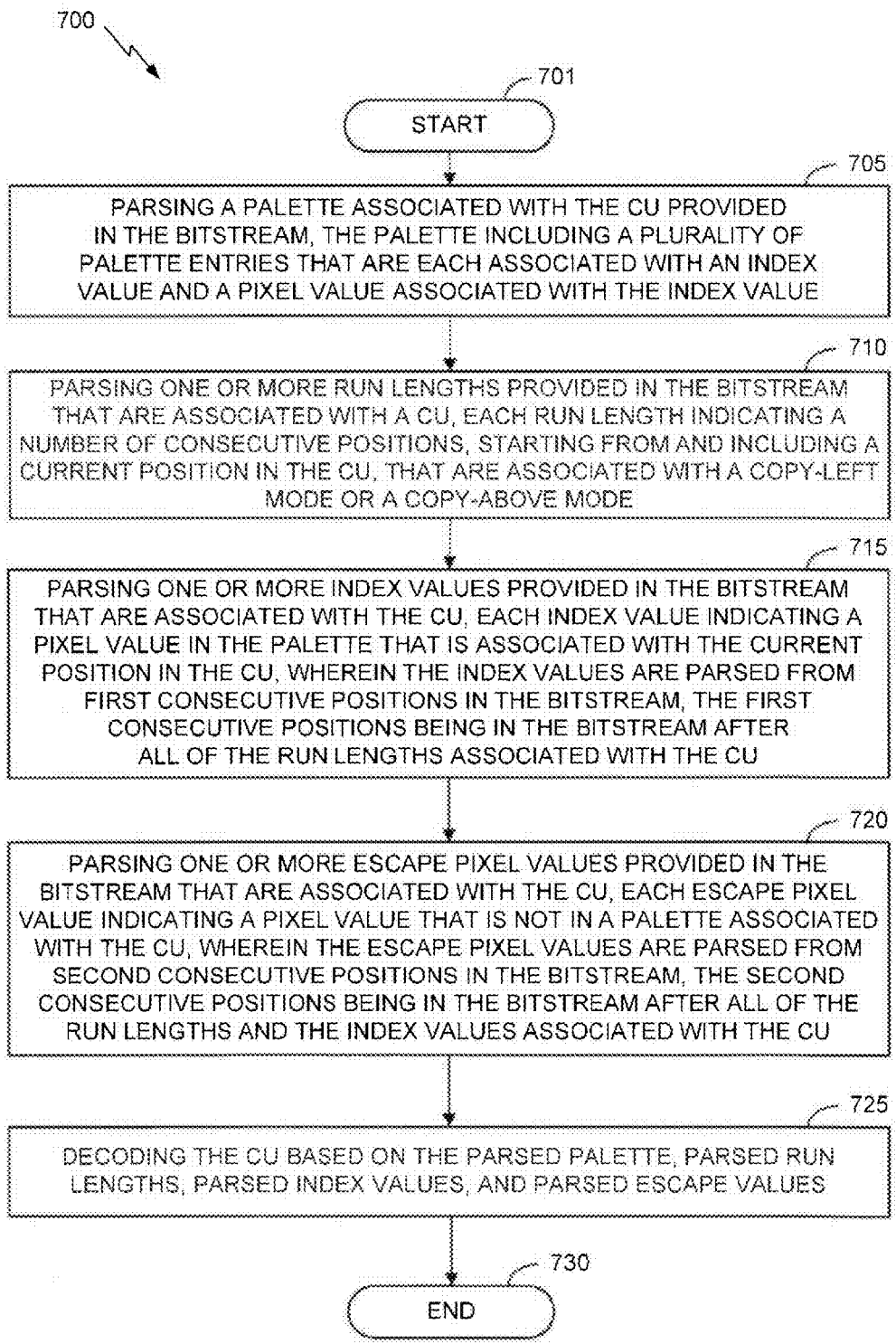
FIG. 7 is a flowchart illustrating another method for decoding video data in a bitstream in accordance with aspects described in this disclosure.

FIG. 7 is a flowchart illustrating a method 700 for decoding non-natural video data in a bitstream in accordance with aspects of the present disclosure. The steps illustrated in FIG. 7 may be performed by a video decoder (e.g., the video decoder 30) or any other component. For convenience, method 700 is described as performed by a video coder (also simply referred to as coder), which may be the video decoder 30 or another component.

The method 700 begins at block 701. At block 705, the coder parses a palette associated with the cu provided in the bitstream. The palette may include a plurality of palette entries that are each associated with an index value and a pixel value associated with the index value. An example of the palette is illustrated in FIG. 4.

At block 710, the coder parses one or more run lengths associated with a CU. As described above, each run length indicates the number of consecutive positions, starting from and including a current position in the CU, that are associated with a copy-left mode or a copy-above mode.

At block 715, the coder parses one or more index values associated with the CU. As described above, each index value indicates a pixel value in the palette that is associated with the current position in the CU. In the example of FIG. 4, an index value of 0 indicates that the current position in the CU has a white pixel value, and an index value of 1 indicates that the current position in the CU has a grey pixel value. In the example of FIG. 7, the index values may be parsed from consecutive positions in the bitstream (e.g., after all of the run lengths associated with the CU). In such embodiments, after all the run lengths have been parsed, the index values can be processed (e.g., parsed) in parallel. For example, the index values may be provided immediately before the escape pixel values in the bitstream.

At block 720, the coder parses one or more escape pixel values associated with the CU. As described above, each escape pixel value indicates a pixel value that is not in the palette associated with the CU. In the example of FIG. 4, the two positions in the CU having black pixel values are coded in escape mode and the coder signals the black pixel values in the bitstream as escape pixel values. In some embodiments, the escape pixel values maybe parsed from consecutive positions in the bitstream (e.g., at the end of the portion of the bitstream associated with the CU) For example, the consecutive positions of the escape pixel values may appear in the bitstream after all the run lengths and index values associated with the CU. In such embodiments, after all the run lengths and the index values have been parsed, the escape pixel values can be processed (e.g., parsed) in parallel. At block 725, the coder decodes the CU based on the parsed palette, parsed run lengths, parsed index values, and parsed escape values. The method ends at block 730.

In the method 700, one or more of the blocks shown in FIG. 7 may be removed (e.g., not performed) and/or the order in which the method is performed may be switched. In some embodiments, additional blocks may be added to the method 700. The embodiments of the present disclosure are not limited to or by the example shown in FIG. 7, and other variations may be implemented without departing from the spirit of this disclosure.

Embodiment #3: Use Offsets to Specify Position of Index Value and Escape Pixel Value In some embodiments, two offsets may be signaled at the beginning of a palette mode block in the bitstream, where the two offsets specify the starting positions of the index value group and the escape pixel value group discussed above, denoted, for example, by S0 and S1, respectively. In the case that the index value group is ahead of the escape pixel value group, only the delta value between the two starting positions may be signaled for the second offset (e.g., offsets S0 and S1-S0 may be signaled). The two offsets can be signaled using various entropy coding methods, e.g., Truncated-Rice, Exponential-Golomb, Truncated-Binary, Fixed Length, Unary, Truncated Unary, etc. In some embodiments, an offset value S2 indicating the end of the palette mode block may also be signaled. Alternatively, the delta value between the second offset and S2 may be signaled (e.g., S2-S1).

Implementation of Grouping Bypass Bins

According to Embodiments #1 and #3 described above, the palette_index_map bitstream may be modified as follows:

TABLE 4 example of modified palette_index_map bitstream

```
while (byte position != S0) {
    run_mode_flag
    if (run_mode_flag == COPY_ABOVE)
        run_length
    else if (run_mode_flag == COPY_LEFT) {
        index
        if (index != ESCAPE_INDEX)
            run_length
    }
    while (not end of block) {
        escape_pixel_value
    }
}
```

According to Embodiments #1, #2, and #3 described above, the palette_index_map bitstream may be modified as follows:

TABLE 5 example palette_index_map bitstream

```
while (byte position != S0) {
    escape_and_run_mode_flag          /*CAN BE '1' '01' '00'*/
    if (escape_and_run_mode_flag != 1) /*NOT AN ESCAPE
                                          PIXEL*/
        run_length
}
while (byte position != S1) {
    index
}
while (byte position != S2) {
    escape_pixel_value
}
```

Index Redundancy Check

In some embodiments, when coding the index values, a redundancy check may be applied. For example, if the previous neighboring position in raster scanning order (denoted as position 'x−1') is the end of a copy-left run mode, then the current index value cannot be the same as its previous neighboring position's index value. In other words, if the position 'x−1' is valid (e.g, is within the current block or is outside the current block but has a deterministic value, for example, through border padding) and is the end of a copy-left run, then the index value for position 'x' cannot be equal to the index value at position 'x−1' (Case 1). The reason is that if the two index values were the same, they would have been merged into a longer copy-left run. In another example, if the previous neighboring position in raster scanning order is the end of a copy-above run mode, and/or if an additional restriction that the current position's above neighbor not be an escape pixel is satisfied, then the current value cannot be the same as its top neighbor's index value. In other words, if the position 'x−1' is valid and is the end of a copy-above run, and/or if an additional restriction that the pixel value above position 'x' not be an escape pixel is satisfied, then the index value for position 'x' cannot be equal to its above neighbor's index value (Case 2). The reason is that if the two index values were the same, they would have been merged into a longer copy-above run. Thus, these examples assume that the encoder follows the 'longest possible run' principle. In either of these cases, the range (e.g., Max value described above) can be reduced by one and bit savings may be achieved.

However, for Case 1, the decoding of the index value at position 'x' depends on the reconstruction of the index value at position 'x−1' (e.g., since the decoder needs to know the index value at position 'x−1' to determine what the index value at position 'x' cannot be). However, the index value for position 'x−1' may not be readily available by the time the index value at position 'x' is being decoded. Thus, this dependency may cause some delay in the decoding process. In order to remove this dependency, in some embodiments, the conditional check for Case 1 may be disabled. In some of such embodiments, the conditional check for Case 2 may still be performed (e.g., since the index value of a position above the current pixel is more likely to be available). In such embodiments, the conditional check for Case 1 is completely disabled. Alternatively, the conditional check for Case 1 may be disabled only for a specific case. For example, the conditional check for Case 1 may be disabled only when the 'limited run' feature is enabled, where the maximum palette index value for which the run length is coded (or the minimum palette index value for which the run length is not coded) is indicated.

Figure 8:
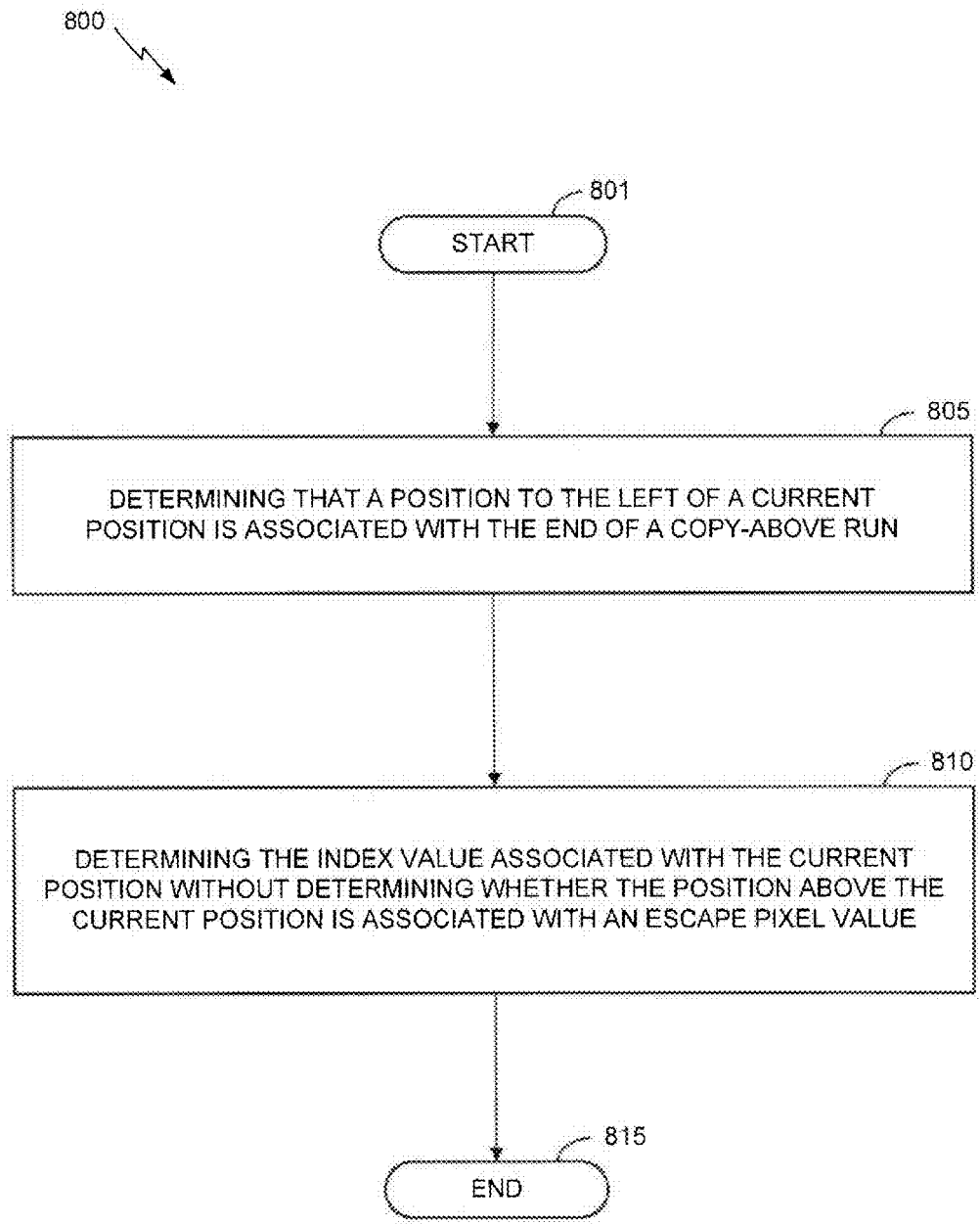
FIG. 8 is a flowchart illustrating another method for coding video data in a bitstream in accordance with aspects described in this disclosure.

In Case 2, the checking of whether the pixel above position 'x' is an escape pixel or not can be removed if the escape pixel is admitted into copy-left or copy-above runs. For example, the escape pixels may be assigned one or more index values that are not in the palette and have their own runs (e.g., just like pixel values in the palette). Similarly, the checking of whether the pixel to the left of position 'x' is an escape pixel or not (e.g., a step that may need to be performed before parsing the current index value at position x, if the given implementation does not allow escape pixels to be copied from the left or from the above) can be removed if the escape pixel is admitted into copy-left or copy-above runs FIG. 8 is a flowchart illustrating a method 800 for coding non-natural video data in a bitstream in accordance with aspects of the present disclosure. The steps illustrated in FIG. 8 may be performed by a video encoder (e.g., the video encoder 20), a video decoder (e.g., the video decoder 30), or any other component. For convenience, method 800 is described as performed by a video coder (also simply referred to as coder), which may be the video encoder 20, the video decoder 30, or another component.

The method 800 begins at block 801. At block 805, the coder determines that a position to the left of a current position in the CU is associated with the end of a copy-above run. As described above, when one or more positions in the CU are coded in copy-above mode, a run length indicating the number of consecutive positions, starting from and including the initial position in the CU, that are associated with the copy-above mode is signaled. Based on the run length, the coder may determine that a given position (e.g., a position that immediately precedes the current position in the CU) is the end of a copy-above run.

At block 810, the coder, in response to determining that the position to the left of the current position is associated with the end of a copy-above run, determines the index value associated with the current position without determining whether the position above the current position is associated with an escape pixel value. As described above, typically, the coder needs to determine whether the position above the current position is associated with an escape pixel value before determining the index value of the current pixel (e.g., if the position above the current position is associated with an escape pixel, the assumption that the index value of the current position does not equal the index value of the position above the current position may become inaccurate. However, in some embodiments of the present disclosure, escape pixels can be part of copy-left or copy-above runs. Thus, a separate check on the position above the current position is not needed. The method ends at block 815.

In the method 800, one or more of the blocks shown in FIG. 8 may be removed (e.g., not performed) and/or the order in which the method is performed may be switched. In some embodiments, additional blocks may be added to the method 800. The embodiments of the present disclosure are not limited to or by the example shown in FIG. 8, and other variations may be implemented without departing from the spirit of this disclosure.

Keeping Maximum Number of Index Bins as Constant

In some implementations of palette mode coding, palette indices are coded using truncated binary code. Assuming that the largest index in the current CU is N (e.g., index value is chosen from $\{0, 1, 2, \ldots, N\}$, inclusively, then the number of bins to code each index can be $\lfloor \log_2(N+1) \rfloor$ or $\lceil \log_2(N+1) \rceil$, if these two values are not equal. As the escape pixel is assigned the largest index (e.g., after all the pixel values in the palette are assigned their index values), coding the escape pixel takes $\lceil \log_2(N+1) \rceil$ bins.

In some cases, by exploiting dependencies, such as the methods described above, the largest symbol value for the current index may be reduced by one. In other words, the escape pixel may take $\lceil \log_2 N \rceil$ or $\lceil \log_2(N+1) \rceil$ bins depending on whether the redundancy removal condition is enabled or not. As a result, the decoder may first need to calculate whether the largest index symbol value is N or N−1 to determine how many bins are need to decode the index. This introduced additional on chip delay and has negative effect to the decoder pipelining. In some embodiments, in order to remove this delay and any negative effects on the decoder pipelining, this redundancy removal mechanism may be restricted. For example, the maximum number of bins used for index coding may be set to a constant. In one example, the escape pixel's index value may always use ceil(log2(N+1)) bins. In another example, if ceil(log2(N+1)) is equal to ceil(log2(N)), the redundancy removal procedure for escape pixels is enabled, and otherwise, the redundancy removal procedure for escape pixels is disabled.

Encoder Side Flowchart

Figure 9:
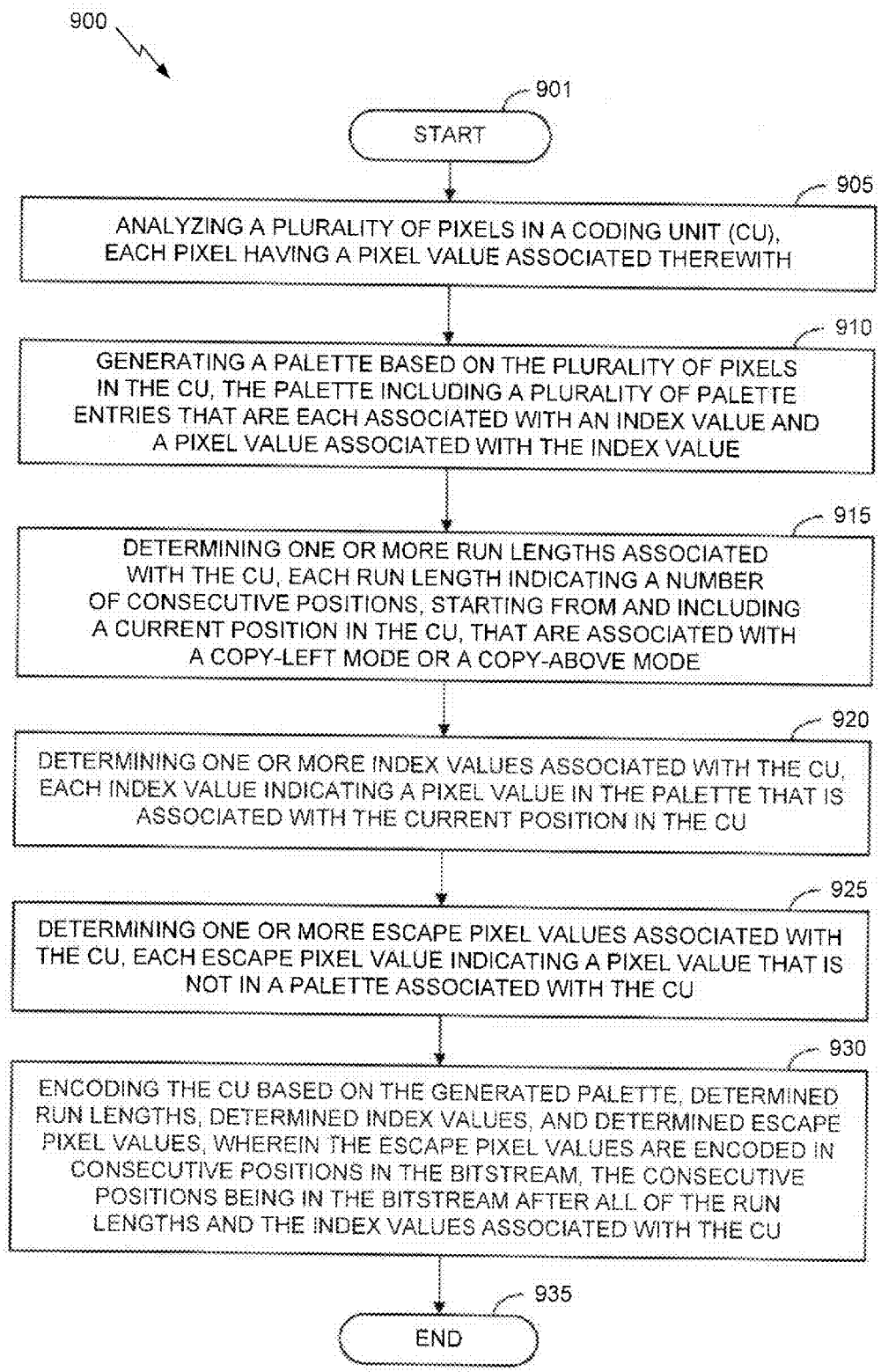
FIG. 9 is a flowchart illustrating a method for encoding video data in a bitstream in accordance with aspects described in this disclosure.

FIG. 9 is a flowchart illustrating a method 900 for encoding video data in a bitstream in accordance with aspects of the present disclosure. For example, the video data may be non-natural video data that includes computer-generated screen contents. The steps illustrated in FIG. 9 may be performed by a video encoder (e.g., the video encoder 20) or any other component. For convenience, method 900 is described as performed by a video coder (also simply referred to as coder), which may be the video encoder 20 or another component.

The method 900 begins at block 901. At block 905, the coder analyzes a plurality of pixels in a coding unit (CU). Each pixel in the CU may be associated with a pixel value. For example, multiple pixels in the CU may have the same pixel value.

At block 910, the coder generates a palette based on the plurality of pixels in the CU. The palette may include a plurality of palette entries that are each associated with an index value and a pixel value associated with the index value. An example of the palette is illustrated in FIG. 4.

At block 915, the coder determines one or more run lengths associated with the CU. As described above, each run length indicates the number of consecutive positions, starting from and including a current position in the CU, that are associated with a copy-left mode or a copy-above mode.

At block 920, the coder determines one or more index values associated with the CU. As described above, each index value indicates a pixel value in the palette that is associated with the current position in the CU. In the example of FIG. 4, an index value of 0 indicates that the current position in the CU has a white pixel value, and an index value of 1 indicates that the current position in the CU has a grey pixel value.

At block 925, the coder determines one or more escape pixel values associated with the CU. As described above, each escape pixel value indicates a pixel value that is not in the palette associated with the CU. In the example of FIG. 4, the two positions in the CU having black pixel values are coded in escape mode and the coder signals the black pixel values in the bitstream as escape pixel values.

At block 930, the coder encodes the CU based on the generated palette, determined run lengths, determined index values, and determined escape pixel values. In some embodiments, the escape pixel values are encoded in consecutive positions in the bitstream (e.g., at the end of the portion of the bitstream associated with the CU). For example, the consecutive positions of the escape pixel values appear in the bitstream after all the run lengths and index values associated with the CU. In such embodiments, after all the run lengths and the index values have been parsed by a decoder, the escape pixel values can be processed (e.g., parsed) in parallel. The method ends at block 935.

In the method 900, one or more of the blocks shown in FIG. 9 may be removed (e.g., not performed) and/or the order in which the method is performed may be switched. In some embodiments, additional blocks may be added to the method 900. The embodiments of the present disclosure are not limited to or by the example shown in FIG. 9, and other variations may be implemented without departing from the spirit of this disclosure.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method for decoding video data provided in a bitstream, the bitstream including a coding unit (CU) coded in palette mode, the method comprising:
    parsing a palette associated with the CU provided in the bitstream, the palette including a plurality of palette entries that are each associated with an index value and a pixel value associated with the index value;
    parsing one or more run lengths provided in the bitstream that are associated with the CU, each run length indicating a number of consecutive positions, starting from and including a current position in the CU, that are associated with a copy-left mode or a copy-above mode;
    parsing one or more index values provided in the bitstream that associated with the CU, each index value indicating a pixel value in the palette that is associated with the current position in the CU, wherein the one or more index values are parsed from first consecutive positions in the bitstream after all of the one or more run lengths associated with the CU;
    parsing one or more escape pixel values provided in the bitstream that are associated with the CU, each escape pixel value indicating a pixel value that is not in the palette, wherein the one or more escape pixel values are parsed from second consecutive positions in the bitstream after all of the one or more run lengths and the one or more index values associated with the CU; and
    decoding the CU based on the parsed palette, parsed one or more run lengths, parsed one or more index values, and parsed one or more escape values.

2. The method of claim 1, further comprising resetting an arithmetic coding variable specifying a range of a current interval associated with the CU after parsing all of the one or more run lengths and the one or more index values associated with the CU.

3. The method of claim 1, wherein the one or more escape pixel values associated with the CU are parsed in parallel after parsing all of the one or more run lengths and the one or more index values associated with the CU.

4. The method of claim 1, further comprising resetting an arithmetic coding variable specifying a range of a current interval associated with the CU after parsing all of the one or more run lengths associated with the CU.

5. The method of claim 1, wherein the one or more index values associated with the CU are parsed in parallel after parsing all of the one or more run lengths associated with the CU.

6. The method of claim 1, further comprising:
determining that a first position in the CU that immediately precedes the current position is associated with an end of a copy-above run; and
in response to determining that the first position in the CU is associated with an end of a copy-above run, determining an index value associated with the current position without determining whether a second position immediately above the current position in the CU is associated with an escape pixel value.

7. The method of claim 1, wherein the CU includes one of a copy-above run or a copy-left run that includes an escape pixel value.

8. An apparatus for decoding video data provided in a bitstream, comprising:
a memory configured to store video data associated with the bitstream, the bitstream including a coding unit (CU) coded in palette mode; and
a processor in communication with the memory and configured to:
parse a palette associated with the CU provided in the bitstream, the palette including a plurality of palette entries that are each associated with an index value and a pixel value associated with the index value;
parse one or more run lengths provided in the bitstream that are associated with the CU, each run length indicating a number of consecutive positions, starting from and including a current position in the CU, that are associated with a copy-left mode or a copy-above mode;
parse one or more index values provided in the bitstream that associated with the CU, each index value indicating a pixel value in the palette that is associated with the current position in the CU, wherein the one or more index values are parsed from first consecutive positions in the bitstream after all of the one or more run lengths associated with the CU;
parse one or more escape pixel values provided in the bitstream that are associated with the CU, each escape pixel value indicating a pixel value that is not in the palette, wherein the one or more escape pixel values are parsed from second consecutive positions in the bitstream after all of the one or more run lengths and the one or more index values associated with the CU; and
decode the CU based on the parsed palette, parsed one or more run lengths, parsed one or more index values, and parsed one or more escape values.

9. The apparatus of claim 8, wherein the processor is further configured to reset an arithmetic coding variable specifying a range of a current interval associated with the CU after parsing all of the one or more run lengths and the one or more index values associated with the CU.

10. The method of claim 8, wherein the processor is configured to parse the one or more escape pixel values associated with the CU in parallel after parsing all of the one or more run lengths and the one or more index values associated with the CU.

11. The method of claim 8, wherein the processor is further configured to reset an arithmetic coding variable specifying a range of a current interval associated with the CU after parsing all of the one or more run lengths associated with the CU.

12. The method of claim 8, wherein the processor is configured to parse the one or more index values associated with the CU in parallel after parsing all of the one or more run lengths associated with the CU.

13. The method of claim 8, wherein the processor is further configured to:
determine that a first position in the CU that immediately precedes the current position is associated with an end of a copy-above run; and
in response to determining that the first position in the CU is associated with an end of a copy-above run, determine an index value associated with the current position without determining whether a second position immediately above the current position in the CU is associated with an escape pixel value.

14. The method of claim 8, wherein the CU includes one of a copy-above run or a copy-left run that includes an escape pixel value.

15. A method for encoding video data in a bitstream, comprising:
analyzing a plurality of pixels in a coding unit (CU), each pixel having a pixel value associated therewith;
generating a palette based on the plurality of pixels in the CU, the palette including a plurality of palette entries that are each associated with an index value and a pixel value associated with the index value;
determining one or more run lengths associated with the CU in the bitstream, each run length indicating a number of consecutive positions, starting from and including a current position in the CU, that are associated with a copy-left mode or a copy-above mode;
determining one or more index values associated with the CU in the bitstream, each index value indicating a pixel value in the palette that is associated with the current position in the CU;
determining one or more escape pixel values associated with the CU in the bitstream, each escape pixel value indicating a pixel value that is not in the palette; and
encoding the CU based on the generated palette, determined one or more run lengths, determined one or more index values, and determined one or more escape pixel values, wherein the one or more index values are encoded in first consecutive positions in the bitstream after all of the one or more run lengths associated with the CU, and the one or more escape pixel values are encoded in second consecutive positions in the bitstream after all of the one or more run lengths and the one or more index values associated with the CU.

16. The method of claim 15, further comprising:
determining that a first position in the CU that immediately precedes the current position is associated with an end of a copy-above run; and
in response to determining that the first position in the CU is associated with an end of a copy-above run, determining an index value associated with the current position without determining whether a second position immediately above the current position in the CU is associated with an escape pixel value.

17. The method of claim 15, wherein the CU includes one of a copy-above run or a copy-left run that includes an escape pixel value.

18. The method of claim 15, further comprising determining a first offset indicating a position in the bitstream that corresponds to an index value having an earliest position among the one or more index values associated with the CU.

19. The method of claim 15, further comprising determining a second offset indicating a position in the bitstream that corresponds to an escape pixel value having an earliest position among the one or more escape pixel values associated with the CU.

20. An apparatus for encoding video data in a bitstream, comprising:
   a memory configured to store video data associated with the bitstream, the bitstream including a coding unit (CU) coded in palette mode; and
   a processor in communication with the memory and configured to:
      analyze a plurality of pixels in a coding unit (CU), each pixel having a pixel value associated therewith;
      generate a palette based on the plurality of pixels in the CU, the palette including a plurality of palette entries that are each associated with an index value and a pixel value associated with the index value;
      determine one or more run lengths associated with the CU in the bitstream, each run length indicating a number of consecutive positions, starting from and including a current position in the CU, that are associated with a copy-left mode or a copy-above mode;
      determine one or more index values associated with the CU in the bitstream, each index value indicating a pixel value in the palette that is associated with the current position in the CU;
      determine one or more escape pixel values associated with the CU in the bitstream, each escape pixel value indicating a pixel value that is not in the palette; and
      encode the CU based on the generated palette, determined one or more run lengths, determined one or more index values, and determined one or more escape pixel values, wherein the one or more index values are encoded in first consecutive positions in the bitstream after all of the one or more run lengths associated with the CU, and the one or more escape pixel values are encoded in second consecutive positions in the bitstream after all of the one or more run lengths and the one or more index values associated with the CU.

21. The apparatus of claim 20, wherein the processor is further configured to:
   determine that a first position in the CU that immediately precedes the current position is associated with an end of a copy-above run; and
   in response to determining that the first position in the CU is associated with an end of a copy-above run, determine an index value associated with the current position without determining whether a second position immediately above the current position in the CU is associated with an escape pixel value.

22. The apparatus of claim 20, wherein the CU includes one of a copy-above run or a copy-left run that includes an escape pixel value.

23. The apparatus of claim 20, wherein the processor is further configured to determine a first offset indicating a position in the bitstream that corresponds to an index value having an earliest position among the one or more index values associated with the CU.

24. The apparatus of claim 20, further comprising determining a second offset indicating a position in the bitstream that corresponds to an escape pixel value having an earliest position among the one or more escape pixel values associated with the CU.

\* \* \* \* \*

UNITED STATES PATENT AND TRADEMARK OFFICE
CERTIFICATE OF CORRECTION

PATENT NO.        : 9,860,560 B2
APPLICATION NO.   : 14/754577
DATED             : January 2, 2018
INVENTOR(S)       : Wei Pu et al.

It is certified that error appears in the above-identified patent and that said Letters Patent is hereby corrected as shown below:

In the Specification

In Column 1 at Line 63, Insert --are-- before "associated with the CU,".

In Column 4 at Line 32, Change "fiom" to --from--.

In Column 5 at Line 59, Change ""first."" to --"first,"--.

In Column 14 at Line 18, Change "CIJ" to --CU--.

In Column 14 at Line 40, Change "0".Each" to --0". Each--.

In Column 19 at Line 38 (Approx.), Change "NAL," to --NAL--.

In Column 21 at Line 15, Change "tilter" to --filter--.

In Column 23 at Line 10 (Approx.), Change "bitstream;" to --bitstream:--.

In Column 23 at Line 25 (Approx.), Change "escape flag," to --escape_flag,--.

In Column 26 at Line 59, Change "CU)" to --CU).--.

In Column 28 at Line 61, Change "runs" to --runs.--.

In Column 31 at Line 65, Change ""processor."" to --"processor,"--.

In the Claims

In Column 32 at Line 45, Insert --are-- before "associated with the CU,".

Signed and Sealed this
Twenty-eighth Day of August, 2018

Andrei Iancu
*Director of the United States Patent and Trademark Office*

CERTIFICATE OF CORRECTION (continued)
U.S. Pat. No. 9,860,560 B2

In Column 33 at Line 44, Insert --are-- before "associated with the CU,".

In Column 33 at Line 66, Change "method" to --apparatus--.

In Column 34 at Line 4, Change "method" to --apparatus--.

In Column 34 at Line 9, Change "method" to --apparatus--.

In Column 34 at Line 13, Change "method" to --apparatus--.

In Column 34 at Line 25, Change "method" to --apparatus--.